(12) United States Patent
Watanabe et al.

(10) Patent No.: US 10,138,847 B2
(45) Date of Patent: Nov. 27, 2018

(54) EVAPORATED FUEL PROCESSING DEVICE

(71) Applicant: Nissan Motor Co., Ltd., Yokohama-shi, Kanagawa (JP)

(72) Inventors: Kazuhisa Watanabe, Kanagawa (JP); Kazuki Toyoda, Kanagawa (JP); Hitoshi Oohashi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/738,898

(22) PCT Filed: Jun. 23, 2015

(86) PCT No.: PCT/JP2015/067947
§ 371 (c)(1),
(2) Date: Dec. 21, 2017

(87) PCT Pub. No.: WO2016/207963
PCT Pub. Date: Dec. 29, 2016

(65) Prior Publication Data
US 2018/0171939 A1    Jun. 21, 2018

(51) Int. Cl.
*F02M 25/08*    (2006.01)
*B60K 15/035*    (2006.01)
*B60K 15/03*    (2006.01)

(52) U.S. Cl.
CPC ... *F02M 25/0836* (2013.01); *B60K 15/03519* (2013.01); *F02M 25/08* (2013.01); *F02M 25/0818* (2013.01); *B60K 15/035* (2013.01); *B60K 2015/03302* (2013.01); *F02M 25/089* (2013.01); *F02M 25/0872* (2013.01); *F02M 2025/0845* (2013.01)

(58) Field of Classification Search
CPC ............. F02M 25/0836; F02M 25/089; F02M 25/0818; F02M 2025/0845; B60K 15/03519; B60K 2015/03302
See application file for complete search history.

(56) References Cited

U.S. PATENT DOCUMENTS 5,954,034 A    9/1999    Takagi
2001/0003978 A1    6/2001    Kitajima et al.
(Continued)

FOREIGN PATENT DOCUMENTS

JP    H08232778 A    9/1996
JP    2000120495 A    4/2000
(Continued)

*Primary Examiner* — Jacob Amick
(74) *Attorney, Agent, or Firm* — Young Basile Hanlon & MacFarlane, P.C.

(57) ABSTRACT

An evaporated fuel processing device includes: an evaporated fuel passage connecting a fuel tank and a canister; a purge passage connecting the canister and an intake passage of an internal combustion engine a first purge control valve arranged to open and close the purge passage; a tank open passage connecting a position on an upstream side of the first purge control valve in the purge passage, and the tank; and a second purge control valve arranged to open and close the tank open passage, when the fuel tank becomes a negative pressure, the second purge control valve being opened to introduce an atmospheric pressure through the canister.

6 Claims, 3 Drawing Sheets

(56) References Cited

U.S. PATENT DOCUMENTS

| | | | |
|---|---|---|---|
| 2001/0010219 A1 | 8/2001 | Isobe et al. | |
| 2004/0089275 A1 | 5/2004 | Kidokoro et al. | |
| 2015/0068498 A1* | 3/2015 | Peters | F02M 25/0854 123/520 |
| 2015/0114360 A1* | 4/2015 | Werner | F02M 25/089 123/520 |

FOREIGN PATENT DOCUMENTS

| | | | |
|---|---|---|---|
| JP | 2005155322 A | 6/2005 |
| JP | 5373459 B2 | 12/2013 |
| JP | 2015081528 A | 4/2015 |

* cited by examiner

EVAPORATED FUEL PROCESSING DEVICE

TECHNICAL FIELD

This invention relates to an evaporated fuel processing device arranged to process an evaporated fuel generated within a fuel tank at refueling by using a canister, specifically to an evaporated fuel processing device of a sealed type fuel tank which includes a blocking valve disposed between the fuel tank and the canister.

BACKGROUND

Conventionally, an evaporated fuel processing device is widely used. This evaporated fuel processing device is arranged to temporarily adsorb an evaporated fuel generated in a fuel tank of a vehicle to a canister using adsorption material (adsorbent) such as activated carbon, then to purge combustion components from the canister by introduction of flesh air during driving of the internal combustion engine, and to introduce it into an intake system of the internal combustion engine. In recent years, as disclosed in a Japanese Patent No. 5373459, there are proposed various evaporated fuel processing devices each of which includes a blocking valve disposed in an evaporated fuel passage connecting the fuel tank and the canister, and each of which is arranged to maintain the fuel tank in a sealed state by basically closing the blocking valve except for at the refueling.

In the above-described evaporated fuel processing device of the sealed type fuel tank which includes the blocking valve, the pressure within the fuel tank may reach the negative pressure while the blocking valve is closed. Japanese Patent No. 5373459 proposes that the blocking valve is opened to introduce the atmospheric pressure through the canister into the fuel tank when the tank internal pressure reaches the negative pressure.

However, in the blocking valve, a relatively large electromagnetic valve is used so as to attain a smooth refueling. Accordingly, when the blocking valve is opened when the fuel tank reaches the negative pressure like Japanese Patent No. 5373459, the gas suddenly flows toward the fuel tank. Consequently, abnormal noise is generated in accordance with the sudden pressure variation within the fuel tank and the flow of the gas.

SUMMARY

It is an object of the present invention to suppress the above-described generation of the abnormal noise at the introduction of the atmospheric pressure to the fuel tank.

An evaporated fuel processing device according to the present invention comprises: an evaporated fuel passage connecting a fuel tank and a canister; a purge passage connecting the canister and an intake passage of an internal combustion engine; a first purge control valve disposed in the purge passage, and arranged to open and close the purge passage; a tank open passage connecting a position on an upstream side of the first purge control valve in the purge passage, and the tank; and a second purge control valve disposed in the tank open passage, and arranged to open and close the tank open passage. The device is configured such that, when the fuel tank reaches a negative pressure, with a blocking valve being closed, the second purge control valve is opened to introduce an atmospheric pressure through the canister to the fuel tank.

That is, when the fuel tank reaches the negative pressure due to the temperature variation and so on, the second purge control valve is opened before the valve opening of the blocking valve, or without opening the blocking valve. With this, the atmospheric pressure is introduced through the canister and the tank open passage into the fuel tank. A size increase of the second purge control valve is not required unlike the blocking valve. In the second purge control valve, a relatively small valve can be used. Accordingly, it is possible to relatively gently start the introduction of the atmospheric pressure, and thereby to suppress the abnormal noise.

DETAILED DESCRIPTION OF THE EMBODIMENTS

Figure 1:
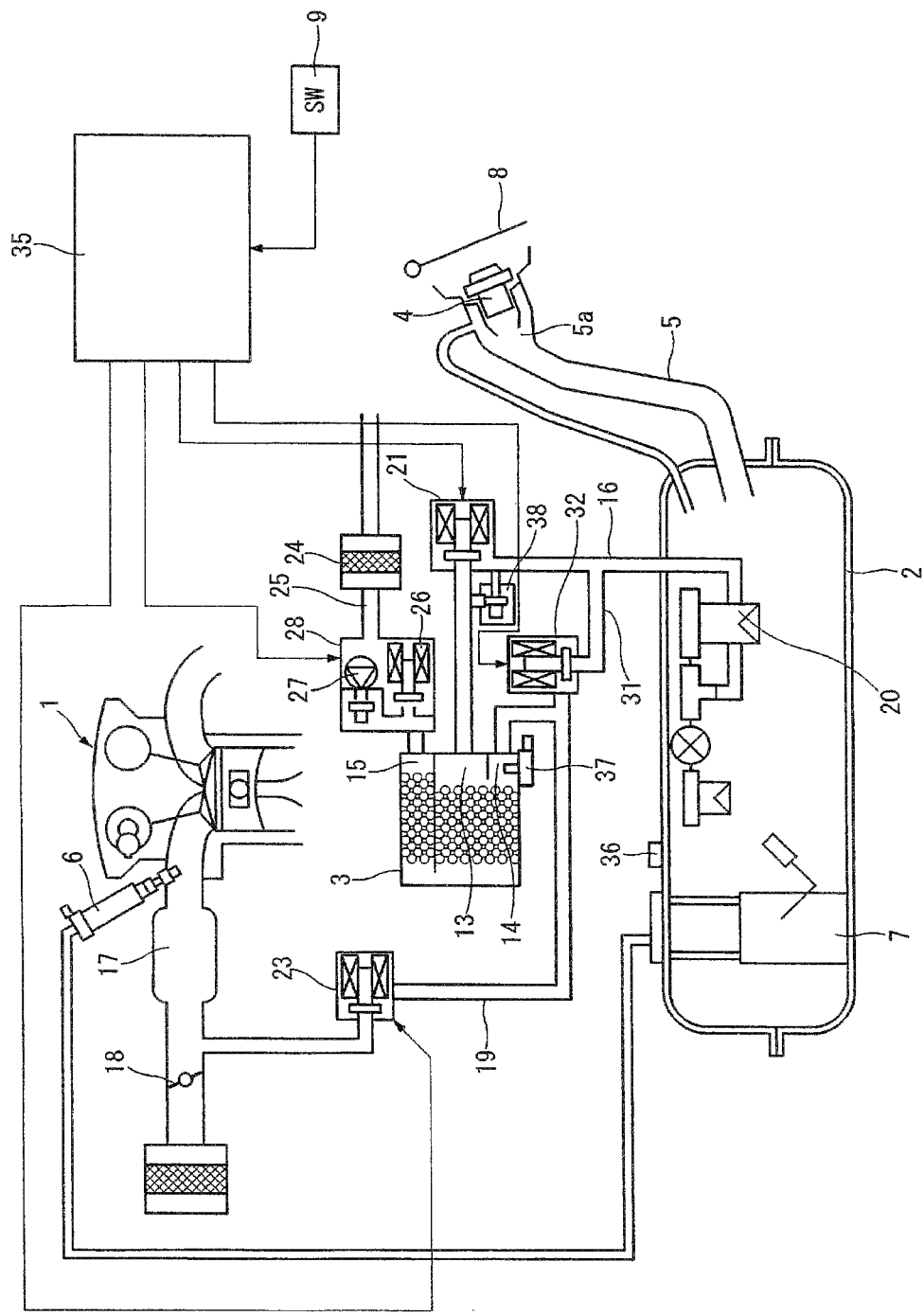
FIG. 1 is a configuration explanation view showing one embodiment of an evaporated fuel processing device according to the present invention.

FIG. 1 is a configuration explanation view showing one embodiment of an evaporated fuel processing (treating) device according to the present invention. An internal combustion engine 1 is mounted to a vehicle not shown. A (hermetically) sealed type fuel tank 2 is provided to the vehicle. Moreover, an evaporated fuel processing device using a canister 3 is provided for processing an evaporated fuel generated in the fuel tank 2 at the refueling. The fuel tank 2 includes a refueling pipe portion 5 including a refueling opening (oil filler port) 5a having a tip end to which a filler cap 4 is detachably mounted. A fuel pump unit 7 is received within the fuel tank 2. The fuel pump unit 7 is arranged to supply the fuel to a fuel injection device 6 of the internal combustion engine 1. The refueling opening 5a is covered with a fuel lid 8 arranged to be electrically locked for restricting an opening of the filler cap 4 in a state where a pressure within the fuel tank 2 is high. This fuel lid 8 is arranged to release the lock based on a signal of a lid open switch 9 provided to a driver seat and so on, in a state where the pressure within the fuel tank 2 is lowered. Besides, the filler cap 4 itself may be locked in place of the lock of the fuel lid 8.

The canister 3 includes a fluid passage which has a U-turn shape, and which is formed by a case made from a synthetic resin. Adsorption material (adsorbent) such as activated carbon is received (filled) within the canister 3. A charge port 13 and a purge port 14 are provided at one end portion of the flow passage having the U-turn shape in the flow direction. The charge port 13 is an inflow portion of the evaporated fuel. The purge port 14 is an outflow portion of the purge gas including combustion (combustible) components. A drain port 15 is provided at the other end portion of the flow passage in the flow direction. The drain port 15 is arranged to take outside air at the purge.

The charge port 13 is connected through an evaporated fuel passage 16 to an upper space of the fuel tank 2. Besides, a tip end portion of this evaporate fuel passage 16 on the fuel tank 2's side is connected to the upper space of the fuel tank 2 through an FLV valve 20 arranged to prevent the liquid fuel from overflowing into the evaporated fuel passage 16 when the fuel liquid level is high. A blocking valve (closing valve) 21 is provided in the middle of the evaporated fuel passage 16. The blocking valve 21 is arranged to open and close the evaporated fuel passage 16. Generally, this blocking valve 21 is arranged to shut off between the canister 3 and the fuel tank 2, except for at the refueling, and to bring the fuel tank 2 to the sealed state. The blocking valve 21 is a normally closed type electromagnetic valve arranged to be closed at deenergization.

The purge port 14 is provided with a first purge control valve 23 which is disposed through the purge passage 19 to an intake system of the internal combustion engine 1, for example, a portion of an intake passage 17 on a download side of a throttle valve 18. A first purge control valve 23 is provided in the purge passage 19. The first purge control valve 23 is arranged to open and close the purge passage 19 for controlling the introduction of the purge gas into the internal combustion engine 1. The first purge control valve 23 is closed for prohibiting the introduction of the purge gas, in predetermined conditions such as non-idling state and the fuel cut state, in addition to the stop of the internal combustion engine 1. The first purge control valve 23 is a normally closed electromagnetic valve. It is preferable that a flow rate control of the first purge control valve 23 can be performed by a variable control of an ON duty ratio.

The drain port 15 is connected to a drain passage 25 including a tip end opened through a filter 24 to the atmosphere. A drain cut valve 26 is provided to this drain passage 25. The drain cut valve 26 is arranged to open and close the drain passage 25. This drain cut valve 26 is a normally open type electromagnetic valve arranged to be opened in the deenergized state. This drain cut valve 26 is arranged to close a system at a leakage (leak) diagnosis. Moreover, for example, when a breakthrough of the canister 3 is sensed by some means, the drain cut valve 26 is arranged to close the system. However, basically, the drain cut valve 26 is in the open state to open the drain passage 25. Moreover, a pressurizing pump 27 is provided in the drain passage 25 in parallel with the drain cut valve 26. The pressurizing pump 27 is used at the leakage diagnosis of the system. The pressurizing pump 27 and the drain cut valve 26 are integrally constituted as a leakage diagnosis module 28.

A tank open passage 31 is provided between the evaporated fuel passage 16 and the purge passage 19, specifically, between a position of the evaporated fuel passage 16 on the fuel tank 2's side of the blocking valve 21, and a position of the purge passage 19 on an upstream side (that is, the canister 3's side) of the first purge control valve 23. The tank open passage 31 connects the evaporated fuel passage 16 and the purge passage 19. A second purge control valve 32 is provided in the middle of the tank open passage 31. The second purge control valve 32 is arranged to open and close the tank open passage 31. This second purge control valve 32 is a normally closed type electromagnetic valve arranged to be closed in the deenergized state. Specifically, a flow rate control of the second purge control valve 32 can be performed by the variable control of the ON duty ratio. In this case, the second purge control valve 32 has a passage area smaller than a passage area of the blocking valve 21. Specifically, as to a diameter (bore) of the port which is opened and closed by a plunger, that of the second purge control valve 32 is smaller than that of the blocking valve 21. Besides, the blocking valve 21 has a sufficiently large passage area so as not to damage (impair) the smooth refueling.

The blocking valve 21, the first purge control valve 23, the second purge control valve 32, the drain cut valve 26, and the pressurizing pump 27 are appropriately controlled by an engine controller 35 performs various controls of the internal combustion engine 1 (for example, a fuel injection amount control, an injection timing control, an ignition timing control, an opening degree control of the throttle valve 18, and so on). A reduction of the pressure within the tank before the opening of the filler cap 4 at the refueling, an adsorption processing at the refueling, the purge processing during the driving of the engine, a negative pressure avoidance processing of the fuel tank 2 (the atmospheric pressure introduction processing) during the driving of the engine, a leakage diagnosis of portions of system, and so on are performed.

A tank pressure sensor 36 is attached to the fuel tank 2. The tank pressure sensor 36 is a pressure sensor arranged to sense the pressure in the system. An evaporation line pressure sensor 37 is attached near the purge port 14 of the canister 3. The evaporation line pressure sensor 37 is a pressure sensor arranged to sense the pressure in the system. The former tank pressure sensor 36 is arranged to sense a pressure (specifically, a pressure in the upper space of the fuel tank 2) of the region on the fuel tank 2's side in the system defined by the blocking valve 21 and the second purge control valve 32. The latter evaporation line pressure sensor 37 is arranged to sense a pressure in a region including the canister 3, in the system surrounded by the blocking valve 21, the second purge control valve 32, the drain cut valve 26, and the first purge control vale 23.

Besides, a bidirectional relief valve 38 is provided in the evaporated fuel passage 16 in parallel with the blocking valve 21. The bidirectional relief valve 38 is arranged to be mechanically opened when the pressure within the fuel tank 2 reaches extremely high, and when the pressure within the fuel tank 2 reaches extremely low.

Basically, in the thus-constructed evaporated fuel processing device, the only evaporated fuel generated at the refueling is adsorbed to the canister 3. The adsorption of the evaporated fuel by the canister 3 is not performed except for at the refueling. That is, the evaporated fuel processing device in this embodiment is preferable to a hybrid vehicle which can be traveled by an EV travelling in which the internal combustion engine 1 is stopped. In this type of vehicle, the frequency of the purge of the canister 3 is low. The adsorption of the evaporated fuel by the canister 3 is limited to the refueling.

During the refueling, in a state where the drain cut valve 26 is opened, the first purge control valve 23 and the second purge control valve 32 are closed, and the blocking valve 21 is opened. With these, the inside of the fuel tank 2 and the charge port 13 of the canister 3 are connected to each other. Accordingly, the evaporated fuel generated within the fuel tank 2 in accordance with the refueling is introduced into the canister 3, and adsorbed to the adsorption material within the canister 3.

Then, the blocking valve 21 is closed after the refueling. Accordingly, the inside of the fuel tank 2 is maintained to the sealed state to be separated from the canister 3. During the stop of the internal combustion engine 1, the adsorption amount of the canister 3 is basically not increased and decreased.

Then, when the traveling of the vehicle is restarted and the internal combustion engine 1 reaches a predetermined driving state, the first purge control valve 23 is appropriately opened in a state where the blocking valve 21 is maintained in the closed state so that the purge of the combustion components from the canister 3 is performed. That is, the atmosphere is introduced from the drain port 15 by the pressure difference with respect to the intake system of the internal combustion engine 1. The combustion components purged from the adsorption material 12 by the atmosphere is introduced through the first purge control valve 23 to the intake passage 17 of the internal combustion engine 1. Accordingly, the adsorption amount of the canister 3 is gradually decreased during the driving of the internal combustion engine 1.

Moreover, in the above-described embodiment, the second purge control valve 32 is opened during the purge of the canister 3 through the first purge control valve 23. The processing of the evaporated fuel within the fuel tank 2 (the direct processing without using the canister 3) is performed in parallel with the purge of the canister 3. At the direct processing of the evaporated fuel within the fuel tank 2 by the internal combustion engine 1, the evaporated fuel does not pass through the canister 3. Accordingly, the adsorption amount of the canister 3 is not increased. Consequently, it is possible to process the evaporated fuel of the fuel tank 2 by the canister 3 with the relatively small capacity.

Moreover, the second purge control valve 32 is used for the atmosphere pressure introduction to the fuel tank 2 when the inside of the fuel tank 2 reaches the negative pressure due to the variation of the outside temperature and so on during the driving of the engine. For example, in a case where the vehicle is moved out from an indoor parking to the outdoors in a cold region (district), the pressure of the fuel tank 2 is brought to the negative pressure state in accordance with the temperature decrease of the fuel tank 2. In this case, in the above-described embodiment, when the negative pressure state within the fuel tank 2 is sensed, firstly, the second purge control valve 32 is opened in a state where the first purge control valve 23 is closed and the drain cut valve 26 is opened. With this, the atmospheric pressure is introduced through the canister 3 into the fuel tank 2. That is, the atmospheric pressure is taken from the drain passage 25. Then, the atmospheric pressure passes through the canister 3, and flows into the fuel tank 2. Then, in a state where the pressure within the fuel tank 2 is closer to the atmospheric pressure to some extent, the blocking valve 21 is opened so that the inside of the fuel tank 2 is opened to the atmospheric pressure. The passage area and the diameter (bore) of the second control valve 32 is smaller than that of the blocking valve 21. Accordingly, the initial increase of the pressure passing through the canister 3 is gently performed to some extent. Accordingly, the generation of the abnormal noise is suppressed at an instant at which the second purge control valve 32 is opened, and at an instant at which the blocking valve 21 is opened after the open of the second purge control valve 32. That is, the release of the negative pressure is performed in two stepped manner by the second purge control valve 32 and the blocking valve 21. Accordingly, it is possible to become rapidly closer to the atmospheric pressure while suppressing the abnormal noise.

Besides, in this embodiment, the second purge control valve 32 and the first purge control valve 23 are disposed in series with each other between the fuel tank 2 and the intake passage 17. Accordingly, only one pipe is enough between the internal combustion engine 1 (the intake passage 17) and the canister 3. Consequently, in particular, this is advantageous in a case where the canister 3 is provided near the fuel tank 2.

Next, FIGS. 2A-2E are operation explanation views showing opening and closing states of the valves and flows of the gas in various modes. Hereinafter, operations of the evaporated fuel processing device are further concretely explained based on the drawings.

Figure 2A:
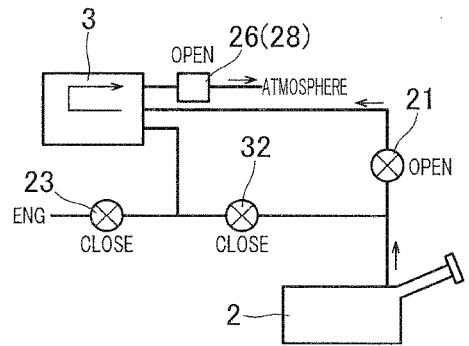
FIGS. 2A-2E are operation explanation views of this evaporated fuel processing device.

FIG. 2(a) shows a mode in a control mode during the refueling. As described above, the drain cut valve 26 is opened. The first purge control valve 23 and the second purge control valve 32 are closed. The blocking valve 21 is opened. The gas including the evaporated fuel extruded from the fuel tank 2 in accordance with the refueling flows through the canister 3 to the outside. The evaporated fuel is adsorbed to the canister 3. The smooth refueling is not deteriorated by using the blocking valve 21 with the sufficient diameter (bore).

Figure 2B:
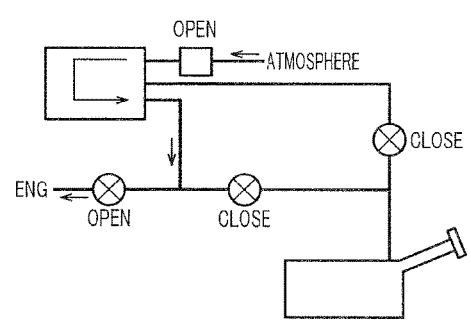

FIG. 2(b) shows a control mode in a state where the purge of the canister 3 is performed during the driving of the internal combustion engine 1. At this time, the drain cut valve 26 is opened. The first purge control valve 23 is opened. The second purge control valve 32 is closed. The blocking valve 21 is closed. Accordingly, the atmosphere passes through the drain cut valve 26 and the canister 3 to become the purge gas. This purge gas is introduced into the intake passage 17 of the internal combustion engine.

Figure 2C:
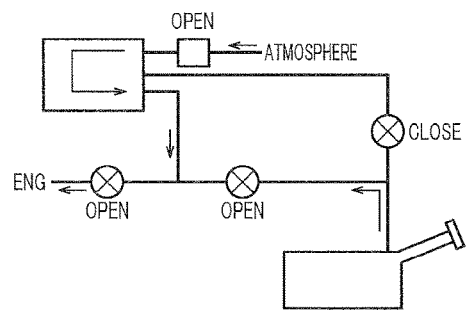

FIG. 2(c) shows a control mode in a state where the direct processing of the evaporated fuel within the fuel tank 2 is performed during the driving of the internal combustion engine 1. As described above, the processing of the evaporated fuel within the fuel tank 2 is performed in parallel with the purge of the canister 3. The drain cut valve 26 is opened. The first control valve 23 and the second purge control valve 32 are opened. The blocking valve 21 is closed. Accordingly, the atmosphere passes through the drain cut valve 26 and the canister 3 to become the purge gas. This purge gas is introduced into the intake passage 17. At the same time, the evaporated fuel within the fuel tank 2 is introduced through the second purge control valve 32 and the first control valve 23 into the intake passage 17. The evaporated fuel is not bypassed to the canister 3 since the blocking valve 21 is closed.

Figure 2D:
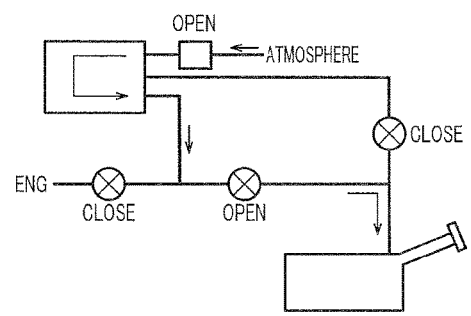

FIG. 2(d) shows an initial operation state when it is sensed that the inside of the fuel tank 2 reaches the negative pressure during the driving of the internal combustion engine 1. The drain cut valve 26 is opened. The first control valve 23 is closed. The second purge control valve 32 is opened. The blocking valve 21 is closed. Accordingly, the atmospheric pressure is introduced through the canister 3 into the fuel tank 2. That is, the atmosphere passed from the drain cut valve 26 through the canister 3 flows into the fuel tank 2.

Figure 2E:
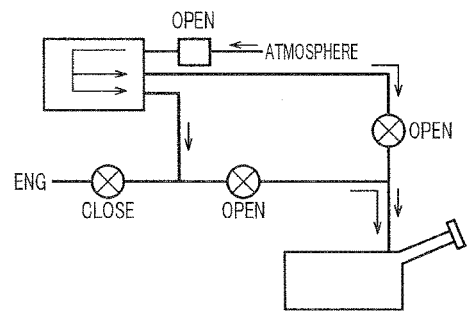

When the pressure within the fuel tank 2 is close to the atmospheric pressure to some extent in accordance with the valve opening of the second purge control valve 32, the blocking valve 21 is further opened, as shown in FIG. 2(e). With this, the pressure within the fuel tank 2 gets rapidly closer to the atmospheric pressure. Then, when the pressure within the fuel tank 2 is sufficiently closer to the atmospheric pressure, the second purge control valve 32 and the blocking valve 21 are closed.

Besides, as shown in FIGS. 2(d) and (e), the atmosphere flows within the canister 3 from the drain port 15 side toward the charge port 13 and the purge purge port 14 at the introduction of the atmospheric pressure for avoiding the negative pressure within the fuel tank 2. Accordingly, the adsorption amount of the canister 3 is decreased.

Figure 3:
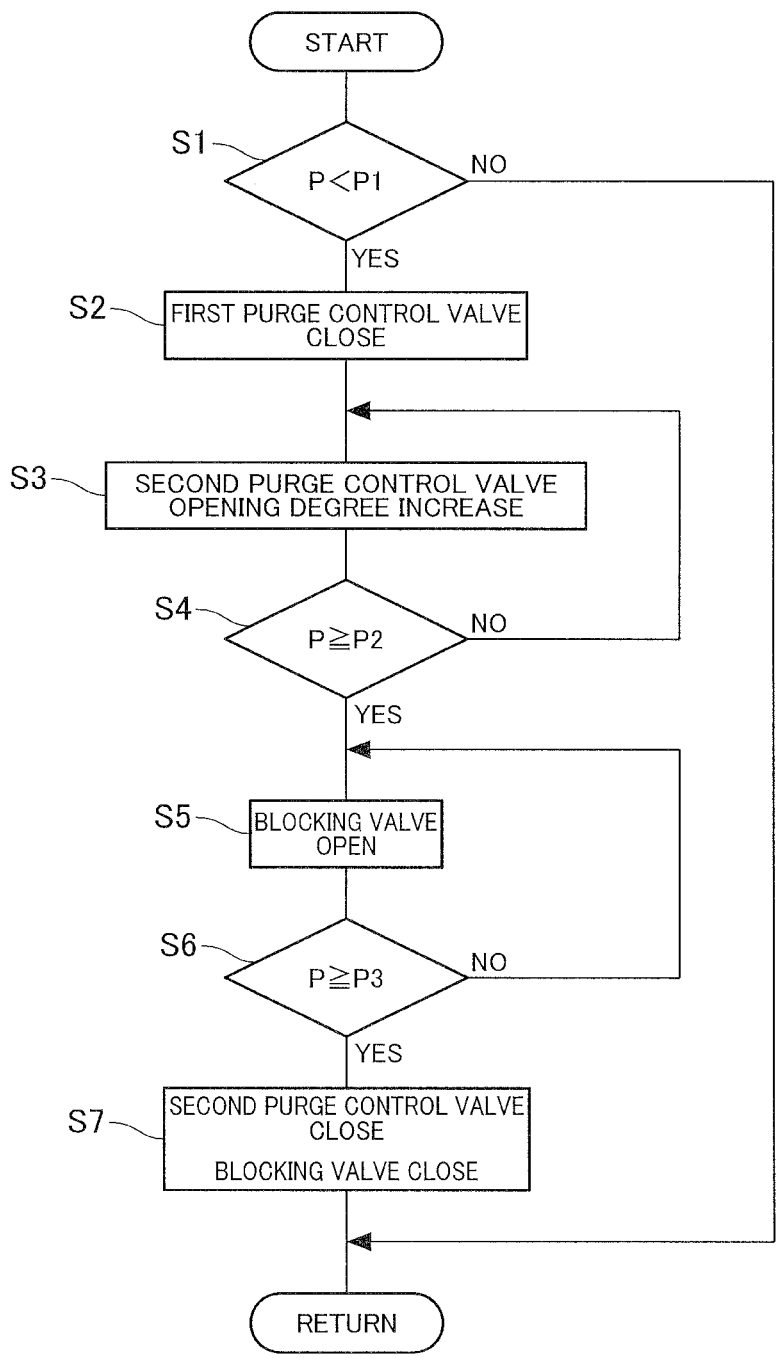
FIG. 3 is a control flowchart of the atmospheric pressure introduction at a negative pressure of a fuel tank.

FIG. 3 is a flowchart showing a flow at the above-described atmospheric pressure introduction control at the negative pressure of the fuel tank 2.

The routine shown in this flowchart is repeatedly performed during the driving of the internal combustion engine 1. At step 1, it is repeatedly sensed whether or not a detection pressure (an absolute pressure) P of the tank pressure sensor 36 is smaller than a first set pressure P1. The first set pressure P1 is set to a level smaller than the atmospheric pressure Patm by a predetermined pressure difference ΔP1. That is, it is sensed whether or not it reaches the predetermined negative pressure. Besides, a detection value of an atmospheric pressure sensor (not shown) may be used as the atmospheric pressure Patm. However, the atmospheric pressure Patm may be a constant value without sensing an actual atmospheric pressure.

When the negative pressure of the fuel tank 2 is sensed at step 1, the process proceeds to step 2. The first purge control valve 23 is closed. Besides, when the first purge control valve 23 is closed in a state where the purge of the canister 3 is not performed, the closed state of the first purge control valve 23 is maintained. Moreover, the blocking valve 21 is maintained in the closed state.

Moreover, the process proceeds to step 3. The ON duty ratio of the second purge control valve 32 is increased. That is, a substantial valve opening degree is increased. Besides, an initial value is zero. By this operation at step 3, the second purge control valve 32 in the closed state is started to be opened. Then, at step 4, it is judged whether or not the detection pressure P of the tank pressure sensor 36 is equal to or greater than a second set pressure P2. This second set pressure P2 is set to a level smaller than the atmospheric pressure Patm by a predetermined pressure ΔP2. In this case, ΔP2<ΔP1 is satisfied. Accordingly, the second set pressure P2 is a negative pressure nearer to the atmospheric pressure than the first set pressure P1. Until the detection pressure P reaches the second set pressure P2, the increase of the ON duty ratio of the step 3 is repeatedly performed. With this, the substantial opening degree (that is, the flow rate) of the second purge control valve 32 is gradually increased.

The detection pressure P of the tank pressure sensor 36 reaches the second set pressure P2, the process proceeds to step S5. The blocking valve 21 is opened. With this, the pressure P within the fuel tank 2 reaches rapidly closer to the atmospheric pressure Patm. Besides, the increase of the ON duty ratio of the second purge control valve 32 may be finished at a timing at which the detection pressure P reaches the second set pressure P2. However, the ON duty ratio may be increased until the ON duty ratio reaches 100%, that is, until the second purge control valve 32 is fully opened.

At a next step 6, it is sensed whether or not the detection pressure P of the tank pressure sensor 36 reaches equal to or greater than a third set pressure P3. This third set pressure P3 is a pressure which can be regarded as the substantially atmospheric pressure. The third set pressure P3 is set to a level lower than the atmospheric pressure Patm by a predetermined pressure ΔP3. In this case, ΔP3<ΔP2 is satisfied. Accordingly, the third set pressure P3 reaches a slightly negative pressure nearer to the atmospheric pressure than the second set pressure P2.

When the detection pressure P of the tank pressure sensor 36 reaches the third set pressure P3, the process proceeds to step 7. The second purge control valve 32 and the blocking valve 21 are opened.

In this way, in the above-described embodiment, when the pressure within the fuel tank 2 reaches the negative pressure due to the temperature variation and so on during the driving, the atmospheric pressure is introduced by using the second purge control valve 32 and the blocking valve 21.

Accordingly, the inside of the fuel tank 2 does not reach the excessively negative pressure. It is possible to suppress the deterioration of the seal portion of the fuel tank 2. Then, the second purge control valve 23 with the small passage area is firstly opened. When the pressure reaches closer to the atmospheric pressure to some extent, the blocking valve 21 is opened. Accordingly, it is possible to suppress the generation of the abnormal noise due to the sudden pressure variation and the sudden flow of the gas.

Besides, in the above-described embodiment, when the detection pressure P of the tank pressure sensor 36 reaches the second set pressure P2, the blocking valve 21 is opened. The present invention is not limited to this. For example, the blocking valve 21 may be opened with the delay of a predetermined time period from the valve opening timing of the second purge control valve 32. The blocking valve 21 may be opened when the ON duty ratio of the second purge control valve 32 reaches a predetermined value (for example, 100%).

Moreover, in the above-described embodiment, one end of the tank open passage 31 is connected to the purge passage 19. However, the one end of the tank open passage 31 may be connected to the purge port 14 by regarding the purge port 14 of the canister 3 as a part of the purge passage.

The invention claimed is:

1. An evaporated fuel processing device comprising:
an evaporated fuel passage connecting a fuel tank and a canister;
a purge passage connecting the canister and an intake passage of an internal combustion engine;
a first purge control valve disposed in the purge passage, and arranged to open and close the purge passage;
a tank open passage connecting a position on an upstream side of the first purge control valve in the purge passage, and the tank; and
a second purge control valve disposed in the tank open passage, and arranged to open and close the tank open passage, the device configured such that when the fuel tank reaches a negative pressure, with a blocking valve being closed, the second purge control valve is opened to introduce an atmospheric pressure through the canister to the fuel tank.

2. The evaporated fuel processing device as claimed in claim 1, wherein the blocking valve is opened with a delay from the valve opening of the second purge control valve.

3. The evaporated fuel processing device as claimed in claim 1, wherein a passage area of the second purge control valve is set to a value smaller than a passage area of the blocking valve.

4. The evaporated fuel processing device as claimed in claim 1, wherein when the fuel tank reaches a negative pressure during driving of the internal combustion engine, the second control valve is opened to introduce the atmospheric pressure.

5. The evaporated fuel processing device as claimed in claim 1, wherein the first purge control valve is brought to a closed state at the introduction of the atmospheric pressure.

6. The evaporated fuel processing device as claimed in claim 1, wherein an ON duty ratio of the second purge control valve is gradually increased from zero at the introduction of the atmospheric pressure.

* * * * *